Patented July 29, 1947

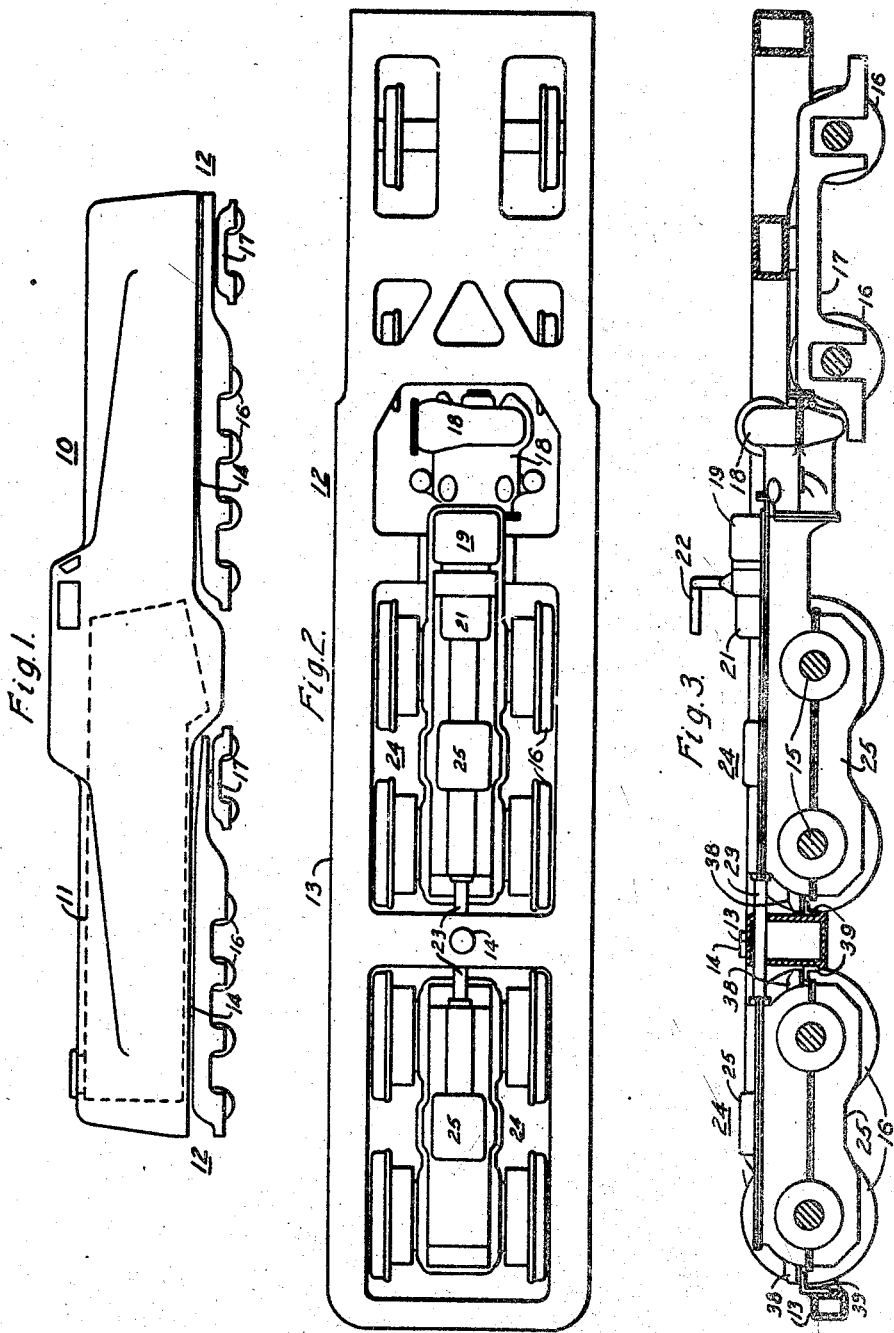

2,424,676

UNITED STATES PATENT OFFICE 2,424,676

TURBINE LOCOMOTIVE

Frank L. Alben, Pittsburgh, Pa., assignor to Westinghouse Electric Corporation, East Pittsburgh, Pa., a corporation of Pennsylvania Application January 25, 1945, Serial No. 574,553

5 Claims. (Cl. 105—38)

My invention relates, generally, to railway locomotives and, more particularly, to locomotives which are driven by fluid turbines.

In order to provide high-speed motive power for hauling heavier freight and passenger trains, it is necessary to provide locomotives having more horsepower output and capable of operating at higher speeds than conventional locomotives. The utilization of steam turbines as the prime movers for locomotives makes possible the provision of a locomotive having sufficient power and speed to meet the requirements of modern railroads.

However, such a locomotive must have a sufficient number of driving wheels to provide the required starting tractive effort. Furthermore, in order to prevent excessive wear on the track, the rail load per axle should not be over approximately 50,000 pounds. It has been determined that a 9000 horsepower locomotive with eight pairs of driving wheels and two four-wheel guiding trucks having a wheel arrangement of a 4–8–4–8 type will meet the foregoing requirements. However, other wheel arrangements may be utilized if desired.

An object of my invention is to provide a truck having a plurality of driving wheels for a turbine driven locomotive.

Another object of my invention is to provide a reduction gear and flexible drive unit for the driving wheels of a locomotive.

A further object of my invention is to provide for removably mounting a combined reduction gear and flexible drive unit in the truck frame of a locomotive.

A more general object of my invention is to provide a simple and efficient means for transmitting the torque of a fluid turbine to a plurality of driving wheels for a locomotive.

Other objects of my invention will be explained fully hereinafter or will be apparent to those skilled in the art.

In accordance with one embodiment of my invention, a locomotive is provided with two truck frames, each truck having four pairs of driving wheels and a four-wheel guiding truck with a turbine disposed between the guiding truck and the first pair of drivers. A longitudinally disposed drive shaft transmits torque from the turbine to the drivers contained in the main truck frame. Reduction gear and flexible drive units are provided for the two pairs of adjacent driving axles. These units are removably mounted in housings supported by the truck frame.

For a fuller understanding of the nature and objects of my invention, reference may be had to the following detailed description, taken in conjunction with the accompanying drawing, in which:

Figure 1 is a view, in side elevation, of a locomotive embodying my invention;

Fig. 2 is an enlarged view, in plan, of one of the driving trucks of the locomotive;

Fig. 3 is a view, partially in side elevation and partially in section, of the truck shown in Fig. 2;

Figure 4:
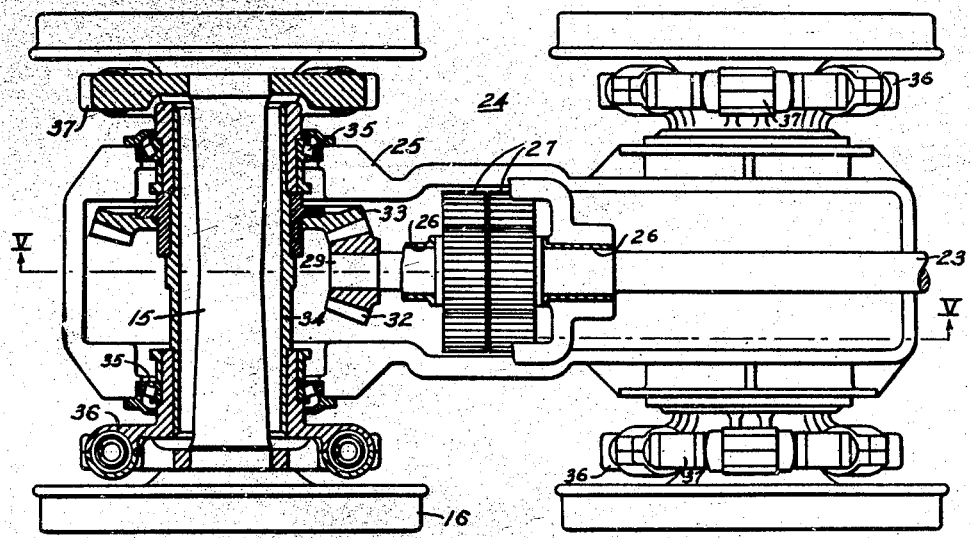
Fig. 4 is an enlarged view, partially in plan and partially in section, of one of the reduction gear and flexible drive units for the locomotive.

Referring to the drawings, and particularly to Figure 1, the locomotive shown therein comprises a cab portion 10 having a boiler 11 disposed therein and space for storing the fuel and water required for operating the locomotive. The cab 10 is carried by two main truck frames 12, which may be identical in construction.

As shown most clearly in Figs. 2 and 3, each truck frame 12 comprises a one-piece steel frame 13 with side members and journal boxes disposed outside of the wheels, and suitable cross members. The boiler and cab superstructure is supported on two center pins 14, there being one center pin for each truck 12. Additional support for the cab may be provided by spring loaded pads, which may be located to obtain a satisfactory distribution of weight on the rails.

Each main truck is provided with four driving axles 15 having wheels 16 secured thereto which are of a relatively small diameter. A four-wheel guiding truck 17 is provided at the front end of each main truck 12. The utilization of small diameter driving wheels permits a comparatively short, rigid wheel base, and also provides additional space for the boiler 11 without increasing the overall height of the locomotive. In this manner, a boiler of sufficient size to generate steam for operating a locomotive having a high horsepower rating may be provided.

The power for propelling the locomotive may be developed by two steam turbines 18, there being one turbine mounted in each main truck 12 and located between the guiding truck 17 and the first pair of driving wheels 16 with its axis disposed longitudinally of the truck frame. A high-speed gear reduction unit 19 may be located between a reverse gear unit 21 and the turbine 18. The reverse gear unit 21 may be operated from the locomotive cab by a mechanical linkage 22, or it may be hydraulically operated if desired.

The torque developed by the turbine 18 is transmitted from the turbine to the driving wheels 16 by means of a drive shaft 23 and gear reduction and flexible drive units 24 which are enclosed in housings 25. The drive shaft 23 is located on the longitudinal center line of the truck and, as shown in Fig. 5, is provided with suitable bearings 26 which are located in the gear unit housings 25.

Figure 5:
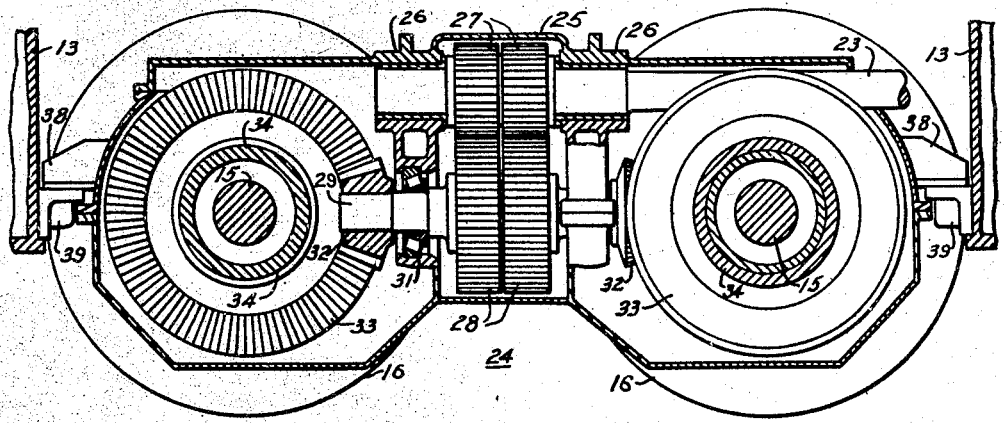
Fig. 5 is a sectional view, taken along the line V—V of Fig. 4.

As shown in Figs. 4 and 5, a combined intermediate and low-speed gear reduction and flexible drive unit 24 is provided for each pair of adjacent driving axles, two such units being required for the four driving axles of each main truck 12. Each intermediate gear reduction comprises two pinions 27 of the spur type, which are secured to the drive shaft 23 and mesh with gears 28 secured to an intermediate gear shaft 29. The shaft 29 is supported by tapered roller bearings 31 mounted in the gear unit housing 25.

Each low-speed gear reduction comprises a pinion 32 of the bevel type, which is pressed on the intermediate gear shaft 29, and a low-speed bevel gear 33, which is secured to a quill 34 surrounding the axle 15. As shown in Fig. 4, the quill 34 is supported on roller bearings 35 housed in the gear unit housing 25.

A double end flexible spring cup quill drive is provided for each axle 15. The flexible drive may be of the type disclosed in the copending application of W. A. Brecht and F. L. Alben, Serial No. 574,554, filed January 25, 1945. As shown, a spring cup spider 36 is pressed on each end of the quill 34 and engages a mating drive spider 37 which is pressed on the axle 15. In this manner, the driving torque is flexibly transmitted to the driving wheels, which may be of a relatively small diameter.

As shown most clearly in Figs. 3 and 5, each gear unit housing 25 is supported by lugs 38, which rest upon brackets 39 secured to cross members of the truck frame 13. The housing 25 is so constructed that the lower half may be removed, thereby permitting the wheels, axles and flexible drive to be removed without disturbing the rest of the driving mechanism.

From the foregoing description, it is apparent that I have provided a locomotive driving truck structure which makes it possible to transmit the torque of a fluid turbine to a plurality of driving axles in a simple and efficient manner. Furthermore, the wheels may be of a relatively small diameter, thereby reducing the wheel base length, as well as making additional space available for the locomotive boiler without increasing the overall height of the locomotive. The present structure makes it possible to provide a steam locomotive having a higher horsepower rating than any previously built.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A locomotive comprising, a cab portion, two main truck frames for supporting the cab, each main truck frame having a turbine with its axis disposed longitudinally of the truck frame, a guiding truck, a plurality of driving axles, said turbine being disposed between the guiding truck and the first driving axle, a drive shaft extending longitudinally of the truck frame and driven by the turbine, and a plurality of reduction gear and flexible drive units disposed between pairs of adjacent axles for connecting each pair of said axles to the drive shaft, each unit being removably mounted in a housing supported by the truck frame and comprising reduction gears rotatably mounted in the housing and driven by said drive shaft, a quill surrounding each axle and rotatably mounted in the housing, said quills being driven by said reduction gears, and means disposed externally of the housing for flexibly connecting the quills to the axles.

2. A locomotive comprising, a cab portion, two main truck frames for supporting the cab, each main truck frame having a turbine with its axis disposed longitudinally of the truck frame, a guiding truck, a plurality of driving axles, said turbine being disposed between the guiding truck and the first driving axle, a drive shaft extending longitudinally of the truck frame and driven by the turbine, a plurality of reduction gear and flexible drive units disposed between pairs of adjacent axles for connecting each pair of said axles to the drive shaft, each unit being removably mounted in a housing supported by the truck frame and comprising an intermediate gear shaft rotatably mounted in the housing and driven by said drive shaft, a quill surrounding each axle and rotatably mounted in the housing, said quills being driven by said intermediate gear shaft, and means for flexibly connecting the quills to the axles.

3. In a locomotive, in combination, a main truck frame, a turbine having its axis disposed longitudinally of the truck frame, a guiding truck, a plurality of pairs of driving axles, said turbine being disposed between the guiding truck and the first driving axle, a drive shaft extending longitudinally of the truck frame and driven by the turbine, a reduction gear and flexible drive unit for connecting each pair of axles to the drive shaft, each unit comprising a housing supported by the truck frame, an intermediate gear shaft rotatably mounted in the housing and driven by the drive shaft, a quill surrounding each axle and rotatably mounted in the housing, said quills being driven by said intermediate gear shaft, and means for flexibly connecting each quill to the axle it surrounds.

4. In a locomotive, in combination, a main truck frame, a turbine having its axis disposed longitudinally of the truck frame, a guiding truck, a plurality of pairs of driving axles, said turbine being disposed between the guiding truck and the first driving axle, a drive shaft extending longitudinally of the truck frame and driven by the turbine, a reduction gear and flexible drive unit for connecting each pair of axles to the drive shaft, each unit comprising a housing supported by the truck frame, an intermediate gear shaft rotatably mounted in the housing parallel to the drive shaft and driven by said shaft, a quill surrounding each axle and rotatably mounted in the housing, bevel gear means for connecting each quill to the intermediate gear shaft, and means for flexibly connecting each quill to the axle it surrounds.

5. In a locomotive, in combination, a main truck frame, a turbine having its axis disposed longitudinally of the truck frame, a guiding truck, a plurality of pairs of driving axles, said turbine being disposed between the guiding truck and the first driving axle, a drive shaft extending longitudinally of the truck frame and driven by the turbine, a reduction gear and flexible drive unit for connecting each pair of axles to the drive shaft, each unit comprising a housing supported by the truck frame, an intermediate gear shaft rotatably mounted in the housing parallel to the drive shaft, reduction gear means for connecting the intermediate gear shaft to the drive shaft, a quill surrounding each axle and rotatably mounted in the housing, bevel reduction gears for connecting each quill to the intermediate gear shaft, and means for flexibly connecting each quill to the axle it surrounds.

FRANK L. ALBEN.

REFERENCES CITED

The following references are of record in the file of this patent:

UNITED STATES PATENTS

| Number | Name | Date |
|---|---|---|
| 1,438,319 | Macleod | Dec. 12, 1922 |
| 1,534,275 | Leathers | Apr. 21, 1925 |
| 1,572,958 | Reid et al. | Feb. 16, 1926 |
| 2,272,679 | Ostermann | Feb. 10, 1942 |